June 5, 1928.

A. M. KROCZEK 1,672,645

BIRD CAGE

Filed April 11, 1927

Inventor
A. M. Kroczek
By B. Telechowiez
Atty.

Patented June 5, 1928.

1,672,645

UNITED STATES PATENT OFFICE.

ANTON M. KROCZEK, OF CHICAGO, ILLINOIS.

BIRD CAGE.

Application filed April 11, 1927. Serial No. 182,663.

The present invention relates to bird cages of the type having a tray and a dome or cage proper in locked engagement with the tray, and has for its main object the provision of adjacent locking means between the tray and the cage proper.

A further object of the invention is to improve the structure, and particularly the locking means of the bird cages disclosed in my Patent No. 1,620,361 and co-pending application filed November 22, 1926, Serial No. 149,881, patented December 27, 1927, Patent No. 1,653,637.

Another object of the present invention is the provision of a locking means which would prevent any shifting or lateral movement of the cage proper upon the base of the cage.

With the above general objects in view and others that will appear as the nature of the invention is better understood, the same consists in the novel construction, combination and arrangement of parts hereinafter described, illustrated in the accompanying drawing and pointed out in the appended claims.

In the drawing forming a part of this application, and in which like designating characters refer to corresponding parts throughout the several views, Fig. 1 is a cross-sectional view on horizontal plane above the tray of the cage looking downwardly;

Figure 1:
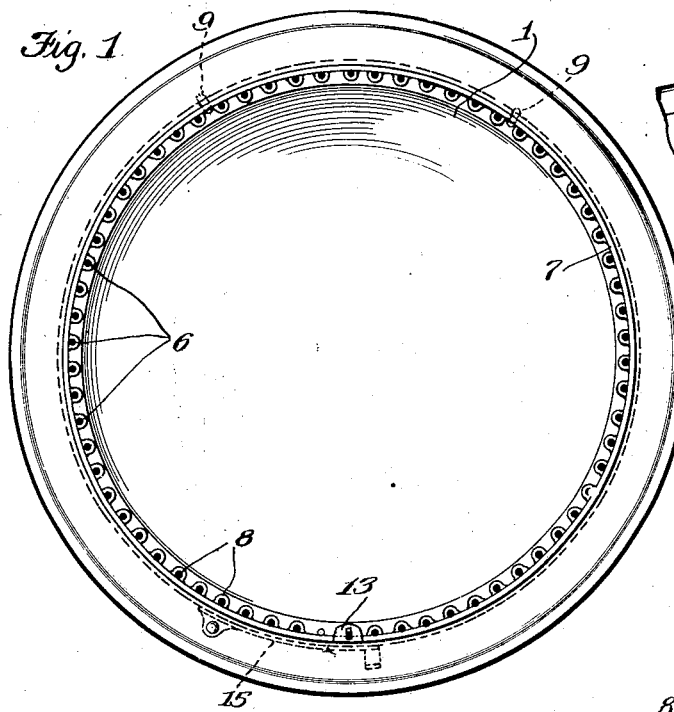
Figure 3:
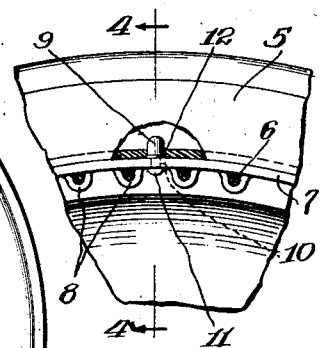
Fig. 3 is a fragmentary enlarged view showing one of the locking means between the tray and the cage proper.

Referring to the drawing there is shown therein a base generally indicated by 1 having a bowl-like portion 2 from which radiates horizontal portion constituting shoulder 3 from which the annular upright portion 4 projects. From said annular upright portion 4 flange or rim 5 flares out on substantially horizontal plane.

Figure 4:
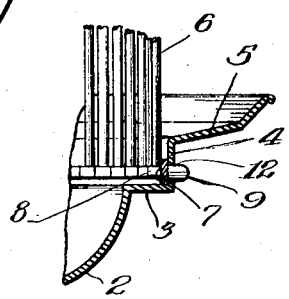
Fig. 4 is a sectional view on vertical plane, taken on line 4—4 of Fig. 3.
Figure 2:
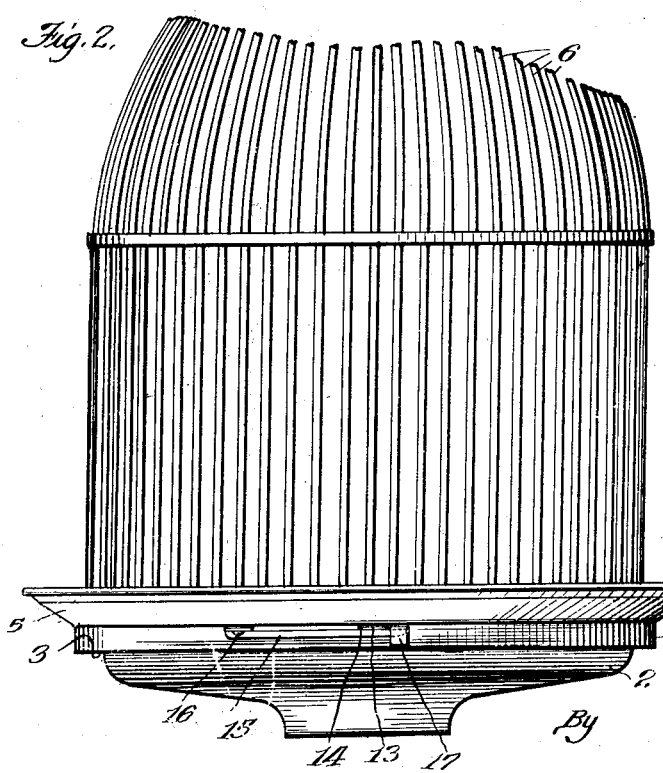
Fig. 2 is a side elevation of the bird cage.

The cage proper or dome embodies a plurality of wire strands 6 which are arranged in a round formation as is clearly apparent from Fig. 1. The lower ends of said wire strands 6 are held in position by annular band 7 wherein the wire strands 6 are frictionally held within loops 8 struck out in said band. Said band is receivable within the annular upright portion 4 of the base 1 and normally is adapted to rest upon the shoulder 3 of said base, as clearly seen on Fig. 4.

The locking means embodying my present invention comprises a pair or more of lugs 9 radially projecting from the annular band 7. Each of said lugs has reduced portions 10 mounted within said annular band 7, the inner ends of said reduced portions 10 being flattened or riveted as at 11 for permanently affixing said lugs 9 to said annular band 7. Said lugs 9 are spaced from each other as seen on Fig. 1. The upright portion 4 of tray 1 is provided with apertures 12 for accommodating said lugs, as seen on Fig. 4, in accordance with which arrangement the dome of the cage may be rigidly locked or joined with the base thereof.

On a line diametrically opposite from the center point upon said annular band 7 between said lugs 9 the base is provided with a shifting locking means embodying lip 13 which passes through slit 14 made in the upper edge of the annular upright portion 4 of the base 1 and adjacent flange 5. Said lip is integrally formed with an arcuate plate 15 which normally rests upon and abuts the outer periphery of said annular upright portion 4 and is affixed or riveted by its other end to the underface of said flange 5 as at 16. At its end adjacent said lip 13 plate 15 is provided with a downwardly bent plate 17 by means of which plate 15 may be shifted away from portion 4 of the base, and consequently by virtue of which operation lip 13 may be withdrawn from its normal engagement with annular band 7, over which band said lip 13 normally is disposed as seen on Fig. 1.

By virtue of the fact that said lugs 9 engage the base at its upright portion 4, as already described, and also in view of the fact that lip 13 normally overhangs annular band 7, the dome or cage proper will be in engagement with the base. To disengage the dome from the base lip 13 is disengaged from annular band 7 by manually pulling upon plate 17, as already described, and the dome is tilted or raised at its portion adjacent said lip 13 or plate 15, and thereupon the lugs 9 are withdrawn from apertures 12.

The advantage of the locking means hereinabove described resides in the fact that the dome and the base are interlocked at three points and any shifting or tilting of the dome with respect to the base is prevented unlike in my co-pending application wherein two locking means are provided and which form a fulcrum upon which the dome has a tendency to tilt or shift sideways as on a pivot. This is entirely eliminated by the present invention.

While there is described herein a preferred embodiment of the present invention, it is nevertheless to be understood that minor changes may be made therein without departing from the spirit and scope of the invention as claimed.

What I claim as new is:

1. In a bird cage including a dome and a tray, an annular band upon said dome, a plurality of lugs upon said annular band, said tray being provided with apertures for receiving said lugs, and locking means upon said tray engaging said annular band, said lugs and said locking means cooperating for maintaing said dome in stationary locked position with respect to said tray.

2. In a bird cage including a dome and a tray, an annular band upon said dome, lugs radially projecting from said annular band, said lugs being spaced on a horizontal plane, the tray being provided with apertures for receiving said lugs, and locking means upon said tray for engaging said annular band.

3. In a bird cage including a dome and a tray, an annular band upon said dome, lugs radially projecting from said annular band, the tray being provided with apertures for receiving said lugs, and locking means upon said tray for engaging said annular band, said lugs and said locking means being in an angular relative juxtaposition on a horizontal plane for preventing any lateral shifting movement of the dome with respect to said tray.

4. In a bird cage including a dome and a tray, an annular band upon said dome, said tray having an upright wall for receiving said annular band, a plurality of lugs radially projecting from said band, said upright wall of said tray having apertures for receiving said lugs, said lugs being spaced on a horizontal line, and a locking means upon said tray for engaging said annular band, said locking means being positioned substantially on a line diametrically opposite from the center point between said lugs.

5. In a bird cage having a dome and a tray, an annular band upon said dome, said dome being adapted to be positioned and fit in said tray, a plurality of lugs upon said annular band, said lugs engaging said tray, and a shifting locking means upon said tray for engaging said annular band.

In testimony whereof I affix my signature.

ANTON M. KROCZEK.